United States Patent [19]

Olligschlager et al.

[11] 4,274,646
[45] Jun. 23, 1981

[54] STEERING COLUMN AND COWL SUPPORT FRAME

[75] Inventors: Rainer C. Olligschlager, Howel; Nelson R. Turner, Monroe, both of Mich.

[73] Assignee: The Model A and Model T Motor Car Reproduction Corporation, Battle Creek, Mich.

[21] Appl. No.: 79,997

[22] Filed: Sep. 28, 1979

[51] Int. Cl.$^3$ ............................................. B62D 1/18
[52] U.S. Cl. ...................................... 280/779; 74/492
[58] Field of Search .................. 280/779, 780; 74/492

[56] References Cited

U.S. PATENT DOCUMENTS

| 3,703,106 | 11/1972 | Arntson | 74/492 |
| 4,086,825 | 5/1978 | Badcock | 74/492 |

Primary Examiner—Randolph A. Reese
Assistant Examiner—John A. Carroll
Attorney, Agent, or Firm—Settle and Walker

[57] ABSTRACT

A steering column and cowl support frame for vehicles having a fiber glass body is disclosed. The support frame comprises a pair of opposed rear braces vertically abutting the inside surface of opposed side walls of the cowl and a pair of opposed front braces extending downward and forward from an upper end of the rear braces. Upper gussets join the upper ends of the front and rear opposed braces together and lower gussets attach a lower end of the front braces to the vehicle frame. A rear portion of the gussets extends rearward a distance and then outward at a rear edge of the cowl to form door hinge supports. A cross brace extends transversely across the vehicle. A pedal support extends longitudinally between the cross brace and a fire wall of the cowl. A horizontal wall of the cross brace is attached at a rear end thereof to the cross brace, and a pair of opposed downward extending vertical walls integral with the top wall support a pair of opposed outward projecting pedal support bushings for the brake and clutch pedals of the vehicle. The steering column has an outward projecting flange at its lower end abutting the floor pan. The lower end of the steering column is secured to the floor pan. A column clamp encircles the steering column and secures the upper end of the steering column to the pedal support bracket.

3 Claims, 7 Drawing Figures

STEERING COLUMN AND COWL SUPPORT FRAME

BACKGROUND OF THE INVENTION

I. Field of the Invention

The present invention relates to the field of vehicle body supports, more specifically the present invention relates to the field of brackets and supports for the cowel of vehicles. Even more specifically the present invention relates to the field of brackets and supports for the cowl of vehicles employing a plastic body such as fiberglass. Specifically the present invention relates to the field of frame and supports for vehicles having a cowl of fiberglass with a support bracket for supporting the surfaces of the cowl, the steering column, and clutch and brake pedal of the vehicle.

II. Prior Art Statement

Cowls for enclosing a forward end of the passenger compartment of vehicles and methods for stiffening the cowls and to support steering columns have long been known. The following United States Patents constitute the closest art related to the present invention that is known to the applicant and his attorney.

U.S. Pat. No. 1,269,955 discloses a bracing attachment which is attached to a cowl of an automobile for supporting a steering column. This U.S. Patent does not disclose an independent frame for supporting the cowl.

U.S. Pat. No. 1,288,972 discloses a bracing attachment which supports the steering column of an automobile, with the bracing attachment supported by the fire wall of the vehicle. This U.S. Patent does not disclose a frame for supporting the cowl and steering column.

U.S. Pat. No. 1,567,899 discloses a bracing structure for cowls of motor vehicles which employs a casting which supports the windshield post and an upper door hinge. A forward end of the casting is affixed to a sheet metal brace extending between an instrument panel and the fire wall. The instrument panel extends transversely across the vehicle for structural support. An upper end of a steering column is supported by the instrument panel. This United States patent does not disclose a pedal support which serves as an upper support for a steering column. No lower door hinge support is disclosed, and the bracing is not used to directly support the side walls of the cowl as in the present invention.

U.S. Pat. No. 1,834,529 discloses a vehicle body construction. The cowl disclosed in this U.S. Patent is made of sheet metal with the pieces riveted together and reinforcing channels formed in the sheet metal to stiffen the surfaces. Independent pieces of angle iron are selectively affixed to the cowl surfaces for stiffening and accessory attachment purposes. This U.S. Patent does not disclose a one piece frame for supporting the cowl, steering column, and clutch and brake pedals as disclosed in the present invention.

U.S. Pat. No. 2,043,050 discloses a front end or cowl construction for automotive vehicles. The cowl in this patent is formed by spot welding together the several pieces which constitute the vehicle cowl. No stiffening frame is disclosed which stiffens the paneling of the cowl and supports the steering column and brake pedals and clutch pedals of the vehicle. A transverse angle brace is disclosed which is spot welded to the door posts and supports the instrument panel. This U.S. Patent does not disclose a frame for supporting the panels of a fiber glass cowl as well as the steering column and clutch and brake pedal supports.

U.S. Pat. No. 2,125,476 discloses a cowl construction consisting of various sheet metal pieces spot welded together to form the cowl. The panels are stiffened by recesses formed therein. This U.S. Patent does not disclose a frame for stiffening the panels of the cowl and for supporting a steering column and brake and clutch pedals as disclosed in the present invention.

U.S. Pat. No. 3,502,346 discloses a vehicle steering column support comprising a pair of opposed support members joined together which is fixedly attached to both the steering column and to the vehicle structure. This U.S. Patent does not disclose a frame structure for supporting the sides of the cowl and the steering column and clutch and brake pedals.

SUMMARY OF THE INVENTION

The present invention comprises a steering column and cowl support frame for vehicles having a cowl of fiberglass or similar materials. The cowl support frame of the present invention comprises a pair of opposed rear braces spaced from a rear edge of the cowl and a pair of opposed front braces joined to an upper end of the rear braces extending downward and forward to the vehicle frame. A lower end of the front and rear braces are affixed to the frame with the braces abutting and affixed to the cowl side walls by an adhesive such as epoxy. A cross brace is affixed to and extends between the upper ends of the braces to give the braces transverse stiffness. In a preferred embodiment, the cross brace is recessed downward at a central portion thereof to clear an instrument cluster.

A pedal support bracket extends longitudinally between the cross brace and the fire wall. The support bracket includes a horizontal top wall and a pair of opposed spaced apart side walls extending vertically downward which are integral with the top wall. A vertical forward flange is affixed to a forward edge of the top wall and side walls. The vertical flange abuts the fire wall and is secured thereto by a plurality of bolts passing through a plurality of apertures in the forward flange aligned with the apertures in the fire wall and a plurality of bolts engage the aligned apertures with nuts threadingly engaging the threaded fasteners to secure the pedal support to the fire wall.

The steering column is supported at a lower end by a lower flange attached thereto which is affixed to a lower end of the cowl and abuts the fire wall. A plurality of apertures formed in the lower flange are aligned with a plurality of apertures formed in the fire wall, and a plurality of bolts engage the aligned apertures with a plurality of nuts threadingly engaging the bolts to secure the lower end of the steering column to the fire wall. A column clamp encircles the steering column at an upper portion thereof. A pair of clamp ends project outward therefrom in a parallel and spaced apart manner with a pair of aligned apertures formed therethrough. The aligned apertures of the ends are aligned with an aperture formed in the side wall of the pedal support bracket and a threaded fastener engages the aligned apertures with a nut threadingly engaging the threaded fastener to secure an upper portion of the steering column to the pedal support bracket.

BRIEF DESCRIPTION OF THE DRAWINGS

In the drawings, like reference numbers refer to like parts throughout the several views, and wherein.

DESCRIPTION OF THE PREFERRED EMBODIMENT

Figure 1:
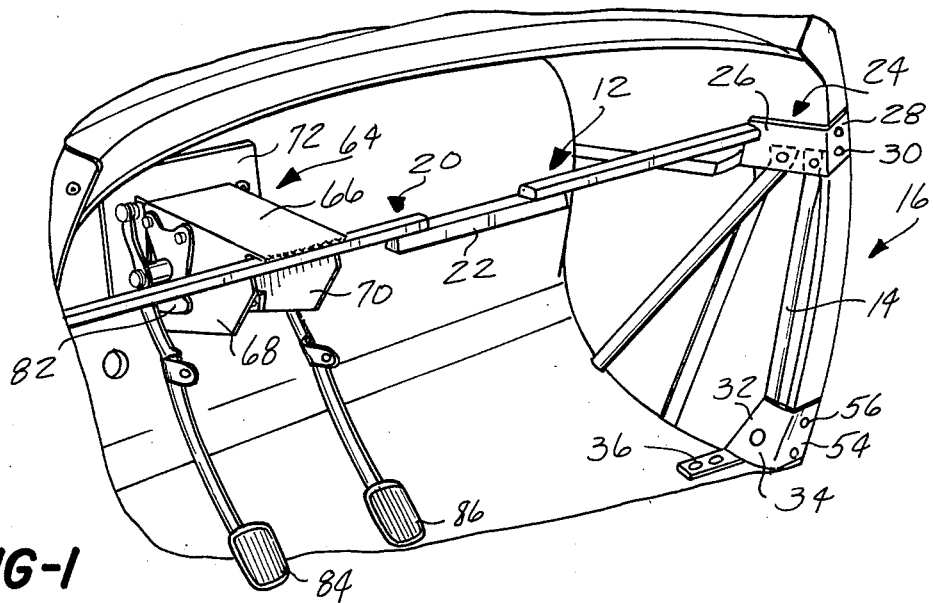
FIG. 1 illustrates a broken perspective view of the interior of the cowl and frame of the present invention.

Referring now to the drawings and in particular to FIG. 1 wherein there is illustrated at 10 a preferred embodiment of the present invention comprising a steering column and cowl support frame 12. The support frame comprises a pair of opposed rear braces 14 spaced from a rear edge of the cowl 16. A pair of opposed front braces 18 extend forward and downward from an upper end of the rear brace to the vehicle frame where they are joined to the frame in a manner which will be described subsequently. The braces 14,18 abut side walls of the cowl 16 and are affixed thereto by epoxy or other suitable adhesives. A cross brace 20 extends transversely across the vehicle and is affixed to an upper end of the braces by welding or other suitable means. In the preferred embodiment a section of the cross brace 20 is removed at a central portion thereof and a splicing piece 22 which is longer than the portion removed abuts a lower wall of the cross brace and is welded thereto to rejoin the cross brace 20. The removed portion of the cross brace 20 provides room for an instrument cluster to be installed in the instrument panel of the vehicle without interference with the cross brace.

A pair of opposed upper gussets 24 are employed to join the upper ends of the front and rear braces. The opposed upper gussets 24 comprise a first vertical planar portion 26 to which the braces are affixed by flattening the ends of the braces and welding or riveting the ends to the planar piece 26. The first planar portion 26 extends rearward to a rear edge of the cowl and then is bent outward to form an upper hinge support 28. A plurality of upper hinged support apertures 30 are formed in the hinge support 28 to mount an upper hinge thereto.

Figure 4:
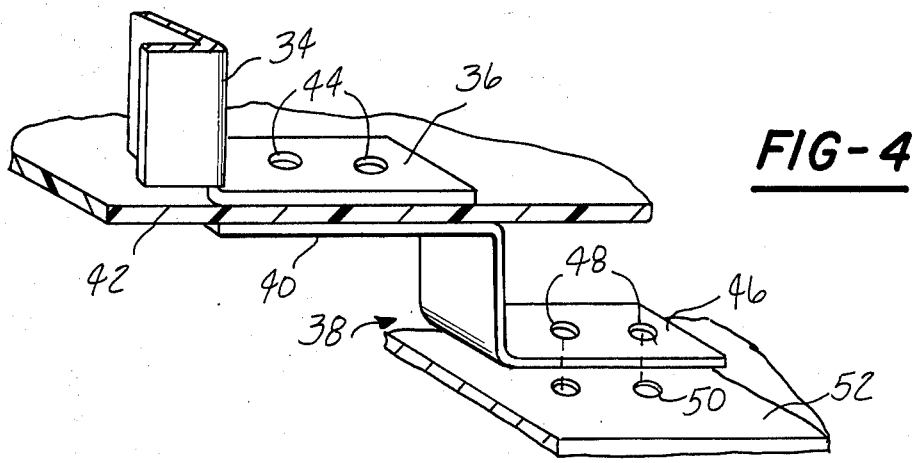
FIG. 4 illustrates a broken perspective view of the rear lower gusset of the present invention and its attachment to the floor pan and frame of the vehicle.

A lower end of the rear braces 14 is affixed to a pair of opposed rear lower gussets 32 which include a second vertical planar portion 34 to which the lower end of the rear braces are affixed by first flattening the ends of the braces 14 and then riveting or welding the flattened ends to the planar portion 34. The second planar portion 34 extends downward to the floor pan and then is bent horizontally inward a distance to form an upper pad 36. A pair of opposed lower brackets 38 (FIG. 4) include a lower pad 40 parallel and spaced below the upper pad configured to sandwich the floor pan 42 between pads. A pair of upper pad apertures 44 formed in the upper pad 36 are aligned with a second pair of apertures (not shown) formed in the floor pan and also aligned with a third pair of apertures (not shown) formed in the lower pad aligned with the first pair of apertures. A pair of rivets (not shown) pass through the aligned apertures and fasten the pads 36,40 to the floor pan 42. An inner end of the lower pad 40 is bent downward a distance and then bent inward to form a frame engaging pad 46. A fourth pair of apertures 48 formed in the frame engaging pad 46 are aligned with a fifth pair of apertures 50 formed in the frame 52. A pair of body bolts (not shown) engage the aligned apertures 48,50 and a pair of nuts (not shown) threadingly engage the body bolts to secure the pair of opposed lower brackets 38 to the frame 52. A rearward projection of the second vertical planar portion 34 extends rearward a distance to the rear edge and then is bent outward forming a lower hinge support 54. A plurality of lower hinge support apertures 56 are formed in the lower hinge support 54 to mount a lower door hinge.

Figure 5:
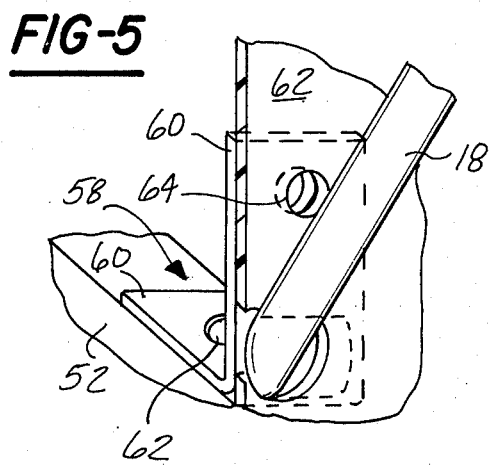
FIG. 5 illustrates a broken perspective view of the attachment of the front lower gusset to the frame of the vehicle.
Figure 6:
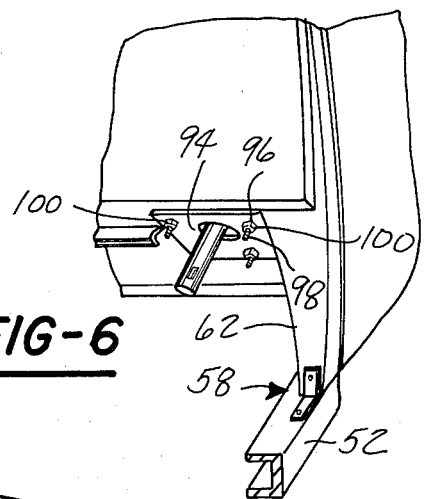
FIG. 6 illustrates a broken perspective view of the steering column support of the present invention as viewed from the engine compartment of the vehicle.

A lower end of the opposed front braces 18 are affixed to a pair of opposed front gussets (FIG. 5). The opposed front gussets 58 comprise a horizontal planar portion 60 abutting the frame 52. An aperture 62 formed in the horizontal planar portion 60 is aligned with an aperture formed in the frame, and a body bolt (not shown) engages the aligned apertures and a nut threadingly engages the body bolt to attach the lower gusset 58 to the frame 52. A rear end of the horizontal portion 60 is bent upward to form a vertical portion 60. A lower end of the front brace 18 is flattened and bent inward flush with the vertical portion to abut the vertical portion 60. The lower end of the front brace 18 is affixed to the vertical portion 60 by rivets or welding or other suitable means. An inward extending flange 62 at a forward edge of the side walls (FIG. 6) abuts the vertical portion 60, and an aperture 64 formed in the inward extending flange 62 is aligned with an aperture formed in the vertical portion and a rivet (not shown) is employed to secure the vertical portion to the inward extending flange and attach the side walls to the opposed front gussets 58.

Figure 2:
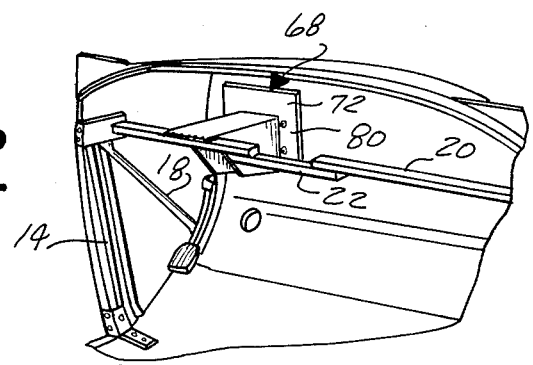
FIG. 2 illustrates a broken perspective view from the right side of the vehicle showing the interior of the cowl and frame of the present invention.
Figure 3:
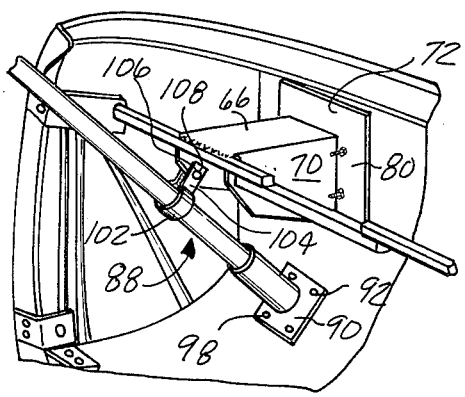
FIG. 3 illustrates a broken perspective view of the steering column support of the present invention.
Figure 7:
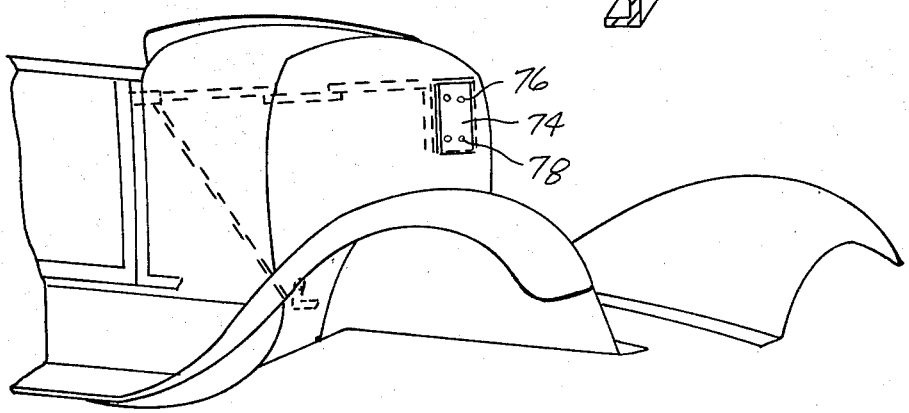
FIG. 7 illustrates a broken perspective view from the engine compartment of the backer plate employed for supporting the pedal support bracket of the present invention.

The steering column and cowl support frame of the present invention further includes a pedal support bracket 64 (FIGS. 1-3) which includes a horizontal top wall 66 affixed by welding or the like to the cross brace at a rear edge thereof and extending to the fire wall. A pair of opposed spaced apart vertical downward extending side walls 68,70 are formed integral with the top wall, and a vertical forward flange 72 is affixed a forward edge of the top wall and side walls with the flange abutting an inside side of the cowl fire wall. A plurality of flanged apertures (not shown) are formed in the forward flange aligned with a plurality of apertures formed in the fire wall (not shown). A booster plate 74 (FIG. 7) complementary to the forward flange abuts an outside side of the fire wall and a plurality of booster plate apertures 76 are formed in the booster plate aligned with the plurality of apertures in the fire wall to receive a plurality of threaded fasteners 78 which engage the aligned apertures and a plurality of nuts 80 threadingly engage the threaded fasteners 78 to secure the pedal support 64 to the fire wall. A pair of opposed pedal support bushings 82 (FIG. 1) are bolted to the vertical walls 68 and pivotally support a pair of brake and clutch pedals 84,86.

The steering column support of the present invention comprises a steering column 88 (FIG. 3) which includes a lower flange 90 affixed to a lower end thereof projecting outward therefrom.

A plurality of lower flange apertures 92 are formed in the lower plate aligned with a plurality of apertures (not shown) formed in the floor pan. A backer plate 94 (FIG. 6) complementary to the lower flange includes a plurality of backer plate apertures 96 aligned with the apertures in the floor pan and the lower flange, and a plurality of threaded fasteners 98 enter the aligned apertures and a plurality of threaded nuts 100 threadingly engage the threaded fasteners 98 to secure the lower flange 90 to the floor pan.

The steering column support further includes a column clamp 102 (FIG. 3) which encircles the steering column 88 at an upper portion thereof. A pair of clamp ends 104 project outward from the column clamp 102 in a parallel and spaced apart manner, and a pair of aligned clamp apertures 106 formed in the ends 104 are aligned with a side wall aperture (not shown) formed in the side wall and a threaded fastener 108 engages the aligned apertures 106 and a nut (not shown) engages the end of the threaded fastener 108 to secure the column upper end to the pedal support bracket 64.

There has been described hereinabove a steering column and cowl support frame for vehicles. The support frame of the present invention is particularly useful in the stiffening and support of steering columns, brake and clutch pedals and the cowl side walls of vehicles made from fiber glass.

Having thus described my invention what I claim is:

1. An automotive body construction comprising
   a pair of parallel, longitudinal frame rails,
   a floor pan superimposed on the frame,
   a substantially vertical fire wall and upstanding side walls cooperating with said floor pan to enclose a cowl space,
   a pair of spaced vertically aligned door hinge support brackets mounted on each of said side walls,
   a horizontal cross brace generally parallel to said fire wall and joining the upper hinge support brackets of the two side walls,
   a pedal support bracket secured to said fire wall and projecting therefrom into contact with said cross brace,
   means securing said pedal support bracket to said cross brace,
   means interconnecting the vertically aligned hinge support brackets on each side wall, and
   a diagonal, downwardly and forwardly inclined side brace interconnecting each of the upper hinge support brackets, respectively, to said frame forwardly of said cross brace.

2. In a body construction as defined in claim 1, a steering column projecting through said fire wall to traverse said cowl space and means interconnecting said steering column and said pedal support bracket.

3. A body construction as defined in claim 1, wherein the door hinge support brackets each have angular extensions projecting into the cowl space, both the means interconnecting the brackets on each side wall and each of the side braces are secured to the angular extensions, and the horizontal cross brace joins the angular extensions of said brackets.

* * * * *